United States Patent [19]

Sullivan

[11] 4,369,763
[45] Jan. 25, 1983

[54] COOKING TABLE

[76] Inventor: James E. Sullivan, 100 Westport Dr., Pittsburgh, Pa. 15238

[21] Appl. No.: 182,790

[22] Filed: Aug. 29, 1980

[51] Int. Cl.³ .............................................. F24C 1/16
[52] U.S. Cl. ............................... 126/276; 126/214 R; 126/214 D; 126/37 R; 312/236; 312/250; 99/425; 108/50
[58] Field of Search ................. 99/449, 423, 425, 410, 99/443 R; 126/9 R, 41 R, 25 A, 268, 265, 37 A, 37 R, 39 N, 39 K, 41 D, 41 E, 51, 276, 216, 214 D, 214 A; 108/50; 312/250, 223, 236; 219/404, 432, 447, 458, 400, 218

[56] References Cited

U.S. PATENT DOCUMENTS

| | | | |
|---|---|---|---|
| 623,143 | 4/1899 | Doty | 108/50 |
| 1,349,634 | 8/1920 | Stern | 312/236 X |
| 1,608,309 | 11/1926 | Dickey . | |
| 2,043,797 | 6/1936 | Horn | 219/218 X |
| 2,207,307 | 7/1940 | Teller et al. | 126/41 |
| 2,225,176 | 12/1940 | Lewis et al. . | |
| 2,258,133 | 10/1941 | Chuma | 108/50 |
| 2,572,870 | 10/1951 | Kennedy . | |
| 2,812,415 | 11/1957 | Markowitz . | |
| 2,898,846 | 8/1959 | Francia | 126/214 A |
| 3,051,160 | 8/1962 | Nielsen | 126/37 R |
| 3,277,881 | 10/1966 | Bruns | 312/236 X |
| 3,332,339 | 7/1967 | Helgeson et al. | 126/41 |
| 3,489,133 | 1/1970 | Kells et al. . | |
| 3,617,693 | 11/1971 | Shimosawa | 219/218 |
| 3,714,885 | 2/1973 | Wertheimer et al. | 99/425 |
| 3,733,027 | 5/1973 | Napier . | |
| 3,853,115 | 12/1974 | Jenn . | |
| 4,026,616 | 5/1977 | Kuchl | 312/250 |

FOREIGN PATENT DOCUMENTS 300053  4/1967  Sweden .............................. 312/250

Primary Examiner—James C. Yeung
Assistant Examiner—Randall L. Green
Attorney, Agent, or Firm—Buell, Blenko, Ziesenheim & Beck

[57] ABSTRACT

A cooking table of the type having a stationary portion at which persons may be seated and a mobile portion comprising a griddle plate movable from table to table. The stationary portion of the table is essentially of U-shape adapted to receive the mobile portion in the hollow of the U to enable preparation of foods, meats and the like and demonstration thereof under the immediate observation of the patrons seated at the table. Gas is made available for use in the griddle when the mobile portion of the table is in place, by conduits or pipes with quick connect and disconnect couplings. Other features for the safety, health and comfort of the persons seated at the table include insulating material in the walls of the mobile unit, flame retardant angles on the underside of the griddle plate to block possible injury to guests seated at the table, and kerf troughs on the underside of the griddle plate to insure collection of grease in perimeter troughs on the inside of the U-opening in the stationary portion. Leveler bolts enable leveling of the griddle plate or other adjustment of the level thereof.

4 Claims, 4 Drawing Figures

COOKING TABLE

This invention relates to a cooking table having a stationary portion, at which persons may be seated, and a mobile unit portion comprising a griddle plate movable from table to table to enable demonstration of methods and processes for preparation of meats and other foods to persons seated at the stationary part of the table.

I am aware of U.S. Pat. No. 3,853,115, issued Dec. 10, 1974, which discloses a cooking table having a stationary portion and a portable or mobile portion. It is the purpose of my invention to provide various improved features in a cooking table of this type for the safety, comfort and health of the persons seated at the stationary part of the table as hereinafter more fully explained.

In a griddle plate, the flow of grease and its disposal is a problem. In order to safeguard the persons seated at the stationary part of the table from hot grease dripping or running from the griddle plate, I provide a kerf channel or groove on the underside of the griddle plate adjacent the periphery of the plate in cooperation with a trough or U-shaped channel on the stationary part of the table to insure collection of grease in the trough as it drips from the kerf.

In order to further protect and assure the comfort of patrons seated at the stationary part of the table, I provide side walls in the mobile unit of a substantial thickness of heat insulating material. I further provide angles of steel or other suitable metal extending around the underside of the griddle plate in spaced parallel relation to the edge to safeguard the patrons from the flames of the burners on the underside of the plate griddle and prevent the flame from reaching the edge of the plate and possibly igniting the grease in the stationary trough paralleling the outer edge of the griddle plate.

As a further improved feature of my invention, I provide a griddle plate of a single piece of steel of substantial thickness so as to prevent warping of the plate due to the heat of the burners underneath the plate and I also provide a number of adjusting screws, preferably at the corners of the plate, for leveling the plate or adjusting the position thereof with respect to the surface of the stationary part of the table.

I further provide quick connect and disconnect couplings in the gas line to the burners under the griddle plate for enabling the mobile unit portion of the table to be quickly removed from the stationary portion at which persons are seated and shifted to another table or simply removed for cleaning.

I further provide the mobile unit portion of the table with a removable hardwood cutting board, where the cook or chef demonstrating a cooking program may exhibit his skill.

The above features will be described in further detail hereinafter in connection with the accompanying drawings, wherein.

Figure 1:
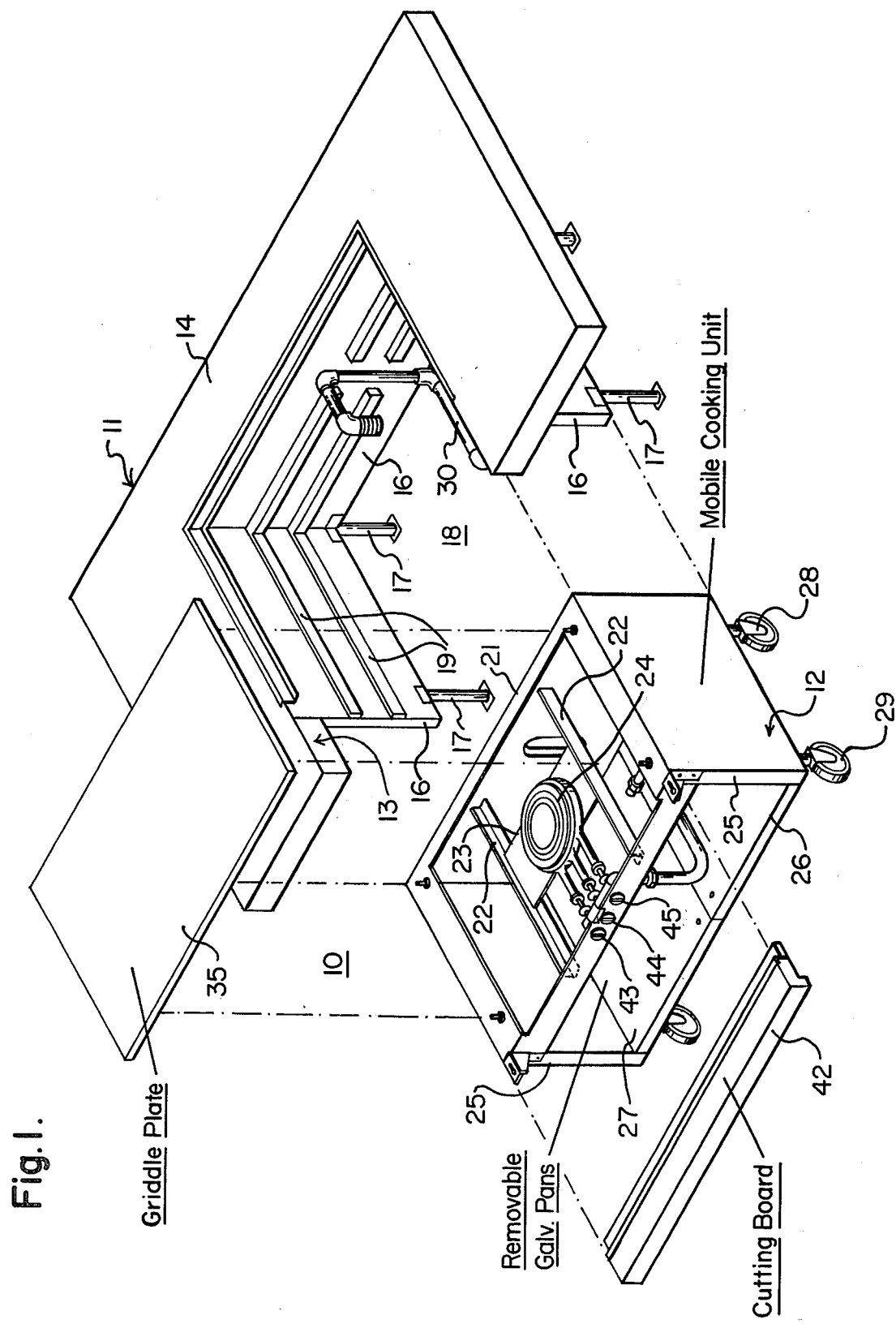
FIG. 1 is an exploded perspective view showing the essential parts and arrangement of my improved cooking table.

Referring to the drawings, it will be seen that my improved cooking table 10 comprises a stationary portion 11 of U-shape and a mobile unit portion 12 adapted to be moved into the U-shape opening 13 of the stationary portion 11.

The stationary portion comprises a U-shaped table top 14 of wood, preferably at least 1¼ inches thick, the outer rim 15 of which is at a right angle to the table top and of a width of about 3 inches. The table top 14 overhangs and is at a right angle to a vertical side wall 16 of three sides as best seen in FIG. 1. Triangular support brackets 20 are interposed between the underside of the table top 14 and the side walls 16. The three side walls 16 are supported on the top of a number of legs 17, preferably of metal, spaced apart and attached as by screws to the floor 18. Attached to the inside of the side walls 16 are several, shown as three, metal strips 19 called glides, the purpose of which will become apparent later on.

The mobile unit portion 12 comprises a top consisting of rectangular steel frame 21 having two parallel angles 22 extending from front to back on which a plate 23 rests and which serves to support a burner 24, shown illustratively as consisting of three circular concentric burner elements. The top steel frame 21 rests on three side walls 25 of substantially thick sheets or slabs of insulating material which are in turn carried on a bottom rectangular frame 26 of steel angles. Removable galvanized sheet metal pans 27 are attached to the bottom rectangular frame to provide a bottom shelf on which utensils may be temporarily stored.

Attached to the bottom rectangular frame 26, at each of the four corners thereof, are four casters 28, the wheels 29 of which rotate on pins which are parallel to the length of the mobile unit. Thus the mobile unit may be moved into and out of the U-shaped opening 13 of the stationary portion of the table. The glides 19 serve to enable the side walls of the mobile unit 12 to glide along the walls of the stationary portion with a minimum of friction.

In order to enable the burner 24 to be quickly connected and disconnected to and from a supply pipe 30 for gas, the back wall 20 of the mobile unit 12 has an opening 31 through which the end of the pipe 30 may extend into the interior of the mobile unit when the unit is pushed home into the U-shaped opening of the stationary part of the table. A section of pipe 32 connected to the burner 24 is suitably bent or formed so that by means of a quick connect and disconnect coupling 33 the pipe may be readily and quickly connected to and disconnected from the end of pipe 30.

Figure 4:
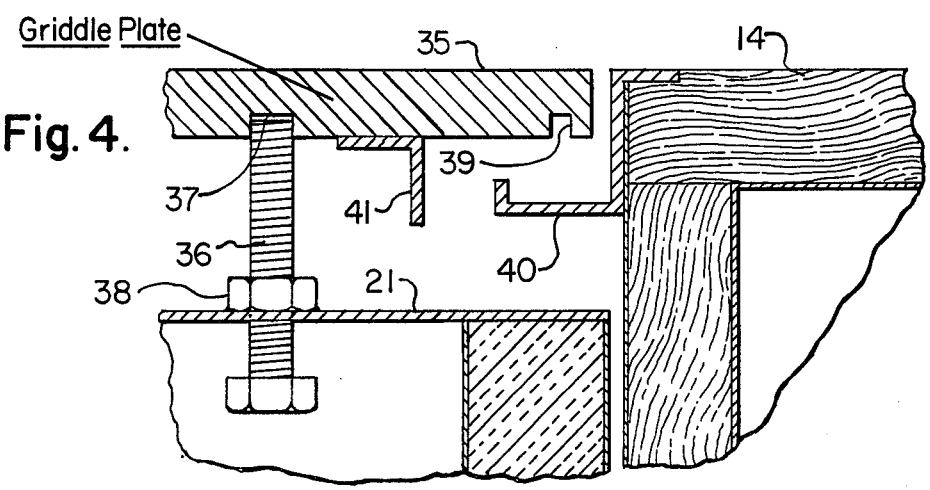
FIG. 4 is a fragmentary view on enlarged scale of the end of the griddle plate and grease trough shown in FIG. 2 and also a detailed view of the manner in which the griddle plate is supported on the leveling screws.

A rectangular griddle plate 35, preferably a steel plate of the order of ¾ inches in thickness, covers the entire top of the mobile unit 12. The griddle plate 35 is adjustably leveled by a plurality of leveling screws 36, located near the corners, which extend through holes in the top steel frame 21. As seen in FIG. 4, the upper ends of the leveling screws seat in corresponding bores or recesses 37 on the underside of the griddle plate, while a nut 38 on the screw may be turned to different positions to vary the level of support on the top steel frame.

In order to block flow of grease from the top of the griddle plate over the edge and onto the table top of the stationary portion of the table, the underside of the griddle plate is provided with a kerf or groove 39 paralleling the edge of the plate. A trough or channel 40 of U-shape is attached to the inside of the side walls 16 of the stationary portion 11 in a position to catch any grease which drips or falls from the kerf. As a further means of protection and security for patrons, a flame retarding angle 41 is attached to the underside of the griddle plate in close parallel relation to the trough 40, thus preventing flames from burner 24 igniting the grease collected in trough 40 or possibly reaching any of the patrons seated at the table top 14. As shown particularly in FIG. 1, a cutting board 42 is removably attached to the top frame 21 so as to project outwardly, thus enabling the cook or chef to employ or utilize the cutting board in demonstrating his culinary skill in the preparation of the meat or other product on the griddle plate.

Figure 2:
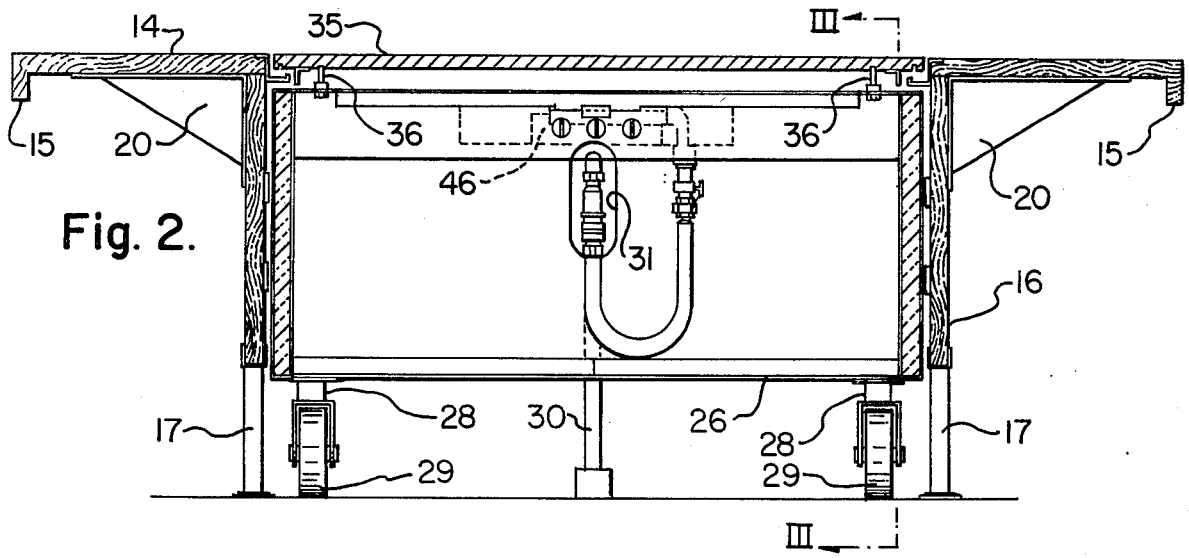
FIG. 2 is a front view of the mobile unit and stationary portion of the cooking table of FIG. 1.
Figure 3:
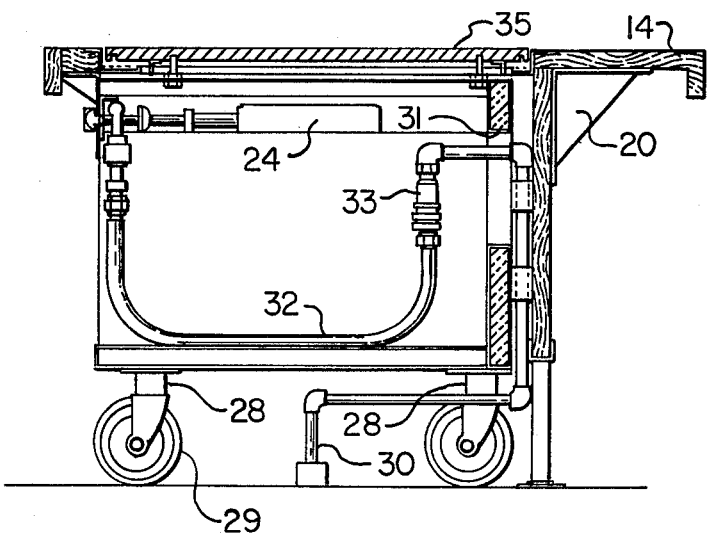
FIG. 3 is a sectional view of my cooking table taken generally on the line III—III of FIG. 2.

As seen in FIGS. 1 and 2, there are several manually operable valves 43, 44 and 45 respectively controlling the supply of gas to the several ring parts of burner 24, conveniently accessible in a front panel 46 immediately under the cutting board 42.

While I have not shown any means for collecting and removing smoke and fumes arising from the use of the griddle on the mobile unit, it will be understood that any conventional means, such as a hood and an exhaust blower, may be provided for the purpose.

It will be apparent that the particular construction which I have devised for my cooking table will have a number of advantages over cooking tables previously known, particularly in the art of demonstrating the preparation of foods and meats by culinary experts. Moreover, while I have shown specific details as comprising my cooking table, modifications thereof are conceivable and I do not intend any limitations in the scope thereof except as are recited in the appended claims.

I claim:

1. In a cooking table of the type comprising a stationary portion with a flat top and supporting means therefor, at which persons may be seated, and a mobile unit portion on castors having cooking means at the top, which portion is movable into relation with the stationary portion, the improvement wherein the stationary portion has a table top in the form of a U, the supporting means comprise sidewalls depending from the table top around the inside of the U, the stationary portion carries a trough attached to said sidewalls extending inwardly into the inside portion of said U on all three sides thereof, said table top overhangs all of said sidewalls outwardly from the U so that persons may be seated for dining around the outside of the U on all three sides thereof, the top of said mobile portion corresponds in dimensions to those of the interior of said U, the cooking means comprise a griddle plate and means for heating same, said mobile portion is movable wholly into said interior so that the griddle plate thereof adjoins flush with the table top of the stationary portion and overhangs said trough whereby drippings from the portion of the griddle plate overhanging said trough fall into the trough, said griddle plate having open grooves on the underside thereof spaced from and parallel to the edges thereof and disposed above said trough when said mobile portion is disposed in said interior of the U whereby drippings from said edges of the griddle plate are prevented from running on the underside of the griddle plate beyond said grooves, and said mobile portion has three sidewalls of insulating material depending from its top which adjoin the sidewalls respectively of the stationary portion when the mobile portion is moved into said interior of the U of said stationary portion.

2. A cooking table according to claim 1 wherein a cutting board coextensive with the width of said mobile unit portion is detachably supported on the side of the mobile unit outside said interior portion of the U when the mobile unit is disposed therein and substantially at the level of said griddle plate.

3. A cooking table according to claim 1 including a burner carried by the mobile unit portion under the griddle plate in close proximity thereto and barrier means attached to the underside of said griddle plate so that when said mobile unit is disposed in said interior portion of said U said barrier means is disposed between the trough and said burner to block passage of flames therefrom to the trough.

4. A cooking table according to claim 1 including level adjusting means on said mobile portion for adjusting the level of the griddle plate with respect to said stationary table top.

* * * * *